Sept. 17, 1963     E. F. ANDERSON     3,103,909
FRONT WHEEL TURN INDICATOR
Filed July 5, 1962
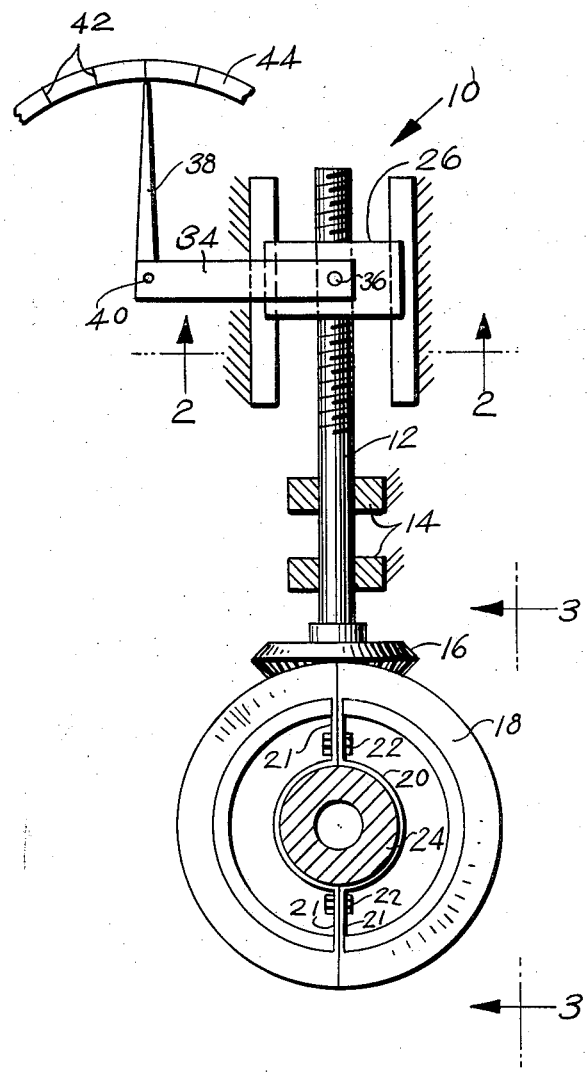
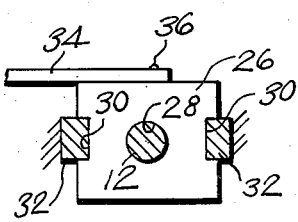
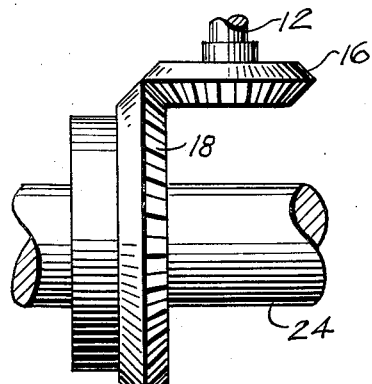
INVENTOR.
Edgar F. Anderson

United States Patent Office 3,103,909
Patented Sept. 17, 1963

3,103,909
FRONT WHEEL TURN INDICATOR
Edgar F. Anderson, Wakefield, Nebr.
Filed July 5, 1962, Ser. No. 207,513
6 Claims. (Cl. 116—31)

This invention relates to indicating devices and more particularly to a front wheel turn indicator for automotive vehicles.

It is an object of the present invention to provide a front wheel turn indicator that will give the driver of a vehicle positive reference as to the angle of the front wheels when he is backing the vehicle to a curb, dock, or loading chute.

Another object of the present invention is to provide a front wheel turn indicator that will tend to prevent a vehicle from being scratched or otherwise damaged as well as preventing the vehicle from striking another vehicle while driving in and out of close quarters.

Other objects of the invention are to provide a front wheel turn indicator bearing the above objects in mind which is of simple construction, has a minimum number of parts, is inexpensive to manufacture and efficient in operation.

For other objects and for a better understanding of the invention, reference may be had to the following detailed description, taken in conjunction with the accompanying drawing, in which:

FIGURE 1 is a front view of the front wheel turn indicator comprising the present invention;

FIGURE 2 is a cross sectional view taken on the lines 2—2 of FIGURE 1; and

FIGURE 3 is a fragmentary view taken on the lines 3—3 of FIGURE 1.

Referring now more in detail to the drawing, a front wheel turn indicator 10 made in accordance with the present invention is shown to include a threaded and elongated shaft 12. A pair of spaced apart stationary bearings 14 freely and slidably receive the rotatable shaft 12 and a bevel gear 16 of small diameter is keyed to the unthreaded end of shaft 12 and is in engagement with a larger diameter split gear 18. The two halves of gear 18 have semi-circular brackets 20 which abut against each other at their outer flanges 21 and are secured to each other by fasteners 22. Fasteners 22 secure gear halves 18 to the automobile or other vehicle steering wheel shaft 24 and when shaft 24 is rotated gear 18 rotates the smaller gear 16. A rectangularly configurated block 26 has a central threaded opening 28 which threadingly receives the threaded end of shaft 12. A pair of oppositely opposed U-shaped openings 30 in the ends of the block 26 freely and slidably receive stationary and elongated guard rails 32. A rectangular arm 34 receives pivot pin 36 at one end and pivot pin 36 is fixedly secured to the top of block 26. A tapered pointer 38 is fixedly secured to the other end of arm 34 by rivet 40. A plurality of graduations 42 on indicator dial 44 provides a means for reading the wheel turn angle.

In operation, the driver turns the steering wheel which is secured to steering wheel shaft 24 and thus the split gear 18 being secured around the outer periphery of shaft 24 will rotate simultaneously with the steering wheel and drive the smaller diameter bevel gear 16 which is toothingly engaged with split gear 18. Gear 16 rotates shaft 12 and block 26 which is threaded to shaft 12 will thus be urged forward or rearward depending on the rotational direction that the steering wheel is being rotated. Guard rails 32 in sliding engagement with the U-shaped openings 30 of block 26 prevent rotation of block 26 and arm 34 pivots upon pivot pin 36 thus moving the pointer 38. The dial graduations 42 provide a means for the driver of the vehicle to observe the angle that the front wheels have taken.

While various changes may be made in the detail construction, it shall be understood that such changes shall be within the spirit and scope of the present invention as defined by the appended claims.

What I claim as new and desire to protect by Letters Patent of the United States is:

1. A front wheel turn indicator comprising in combination a main shaft, a pair of bearings carried by said main shaft, a substantially rectangularly configurated block threadingly receiving said main shaft, a small diameter bevel gear secured to an unthreaded end of said main shaft, a split gear of larger diameter engaging said smaller diameter gear secured to said main shaft providing a driving means for said main shaft, a pair of rails for slidably supporting said block, a substantially rectangular arm pivotally secured to said block, a pointer secured to said arm for indicating the attitude of the front wheels of a vehicle and said shaft being rotatable on an axis which is perpendicular to the axis of rotation of said pointer.

2. A combination according to claim 1, wherein said main shaft is threaded on the forward end receiving said block, and said block receives slidably within a pair of oppositely opposed and substantially U-shaped slots one on each end a fixed and substantially elongated rail, said rails thus preventing said block from rotating when said main shaft is rotated by said large diameter split gear meshing with said smaller diameter gear on the end of said main shaft.

3. A combination according to claim 2, wherein said arm is substantially rectangular in configuration and is pivotably secured by a pivot pin centrally projecting from the top surface of said block and the opposite end of said arm is secured to said pointer which indicates by graduations on an indicator dial the angle of said front wheels when said block is carried forward or backward by the rotation of said threaded end of said main shaft.

4. A combination according to claim 3, wherein said bearings freely receive the unthreaded end of said shaft.

5. A combination according to claim 4, wherein the rotation of the vehicle steering wheel by said operator simultaneously rotates said split gear and said split gear is composed of two semi-circular halves with central bracket means for securing said halves of said split gear to said steering wheel shaft with suitable fasteners.

6. A combination according to claim 5, wherein said rectangular arm secured to the upper surface of said block actuates said pointer by pivoting around a rivet freely received through its extended end and said rivet is stationary.

References Cited in the file of this patent
UNITED STATES PATENTS
2,707,451    Brink _____ May 3, 1955
FOREIGN PATENTS
487,032    France _____ Mar. 5, 1918